United States Patent [19]

Densham

[11] 4,442,936
[45] Apr. 17, 1984

[54] ENGINE OIL DRAINING ASSEMBLY

[76] Inventor: Robert L. Densham, 513 N. Peachtree Rd., Dunwoody, Ga. 30338

[21] Appl. No.: 959,886

[22] Filed: Nov. 13, 1978

[51] Int. Cl.³ .............................................. B65D 69/00
[52] U.S. Cl. ................................... 200/223; 206/218; 206/577; 206/806; 141/314
[58] Field of Search .............. 206/223, 577, 806, 218; 220/404, 408, 410, 403; 141/313, 314, 316, 317, 390; 229/15

[56] References Cited

U.S. PATENT DOCUMENTS

| | | | |
|---|---|---|---|
| 2,553,232 | 5/1951 | Beyer | 220/404 X |
| 2,912,702 | 11/1959 | Mackenzie | 220/404 X |
| 3,014,637 | 12/1961 | Wilson | 229/15 |
| 3,052,371 | 9/1962 | Van Bemmelen | 220/404 |
| 3,148,770 | 9/1964 | Cosman | 206/806 X |
| 3,632,038 | 1/1972 | Souza | 220/404 X |
| 3,703,956 | 11/1972 | Oswalt | 206/223 |
| 3,709,325 | 1/1973 | Gordon et al. | 220/410 X |
| 3,851,762 | 12/1974 | Liblick | 206/450 X |
| 3,983,914 | 10/1976 | Benson | 141/390 |
| 4,022,257 | 5/1977 | O'Connell | 141/314 X |
| 4,098,398 | 7/1978 | Meyers | 206/223 |
| 4,153,155 | 5/1979 | Benno | 220/404 |

FOREIGN PATENT DOCUMENTS 1475792 2/1967 France .............................. 206/806

Primary Examiner—Joseph Man-Fu Moy
Attorney, Agent, or Firm—Newton, Hopkins & Ormsby

[57] ABSTRACT

An assembly or kit to enable the individual automobile owner to drain and change engine oil conveniently and economically at regular intervals without the necessity of visiting a service station and encountering higher cost. A compact package suitable for displaying in supermarkets, department stores and the like contains all the elements necessary to drain engine oil in a clean and convenient manner and to add new oil to the engine. The packaged components include an easily erectable drain receptacle and liner, a strainer and a funnel, with integral foldable supports for the strainer on the receptacle.

2 Claims, 8 Drawing Figures

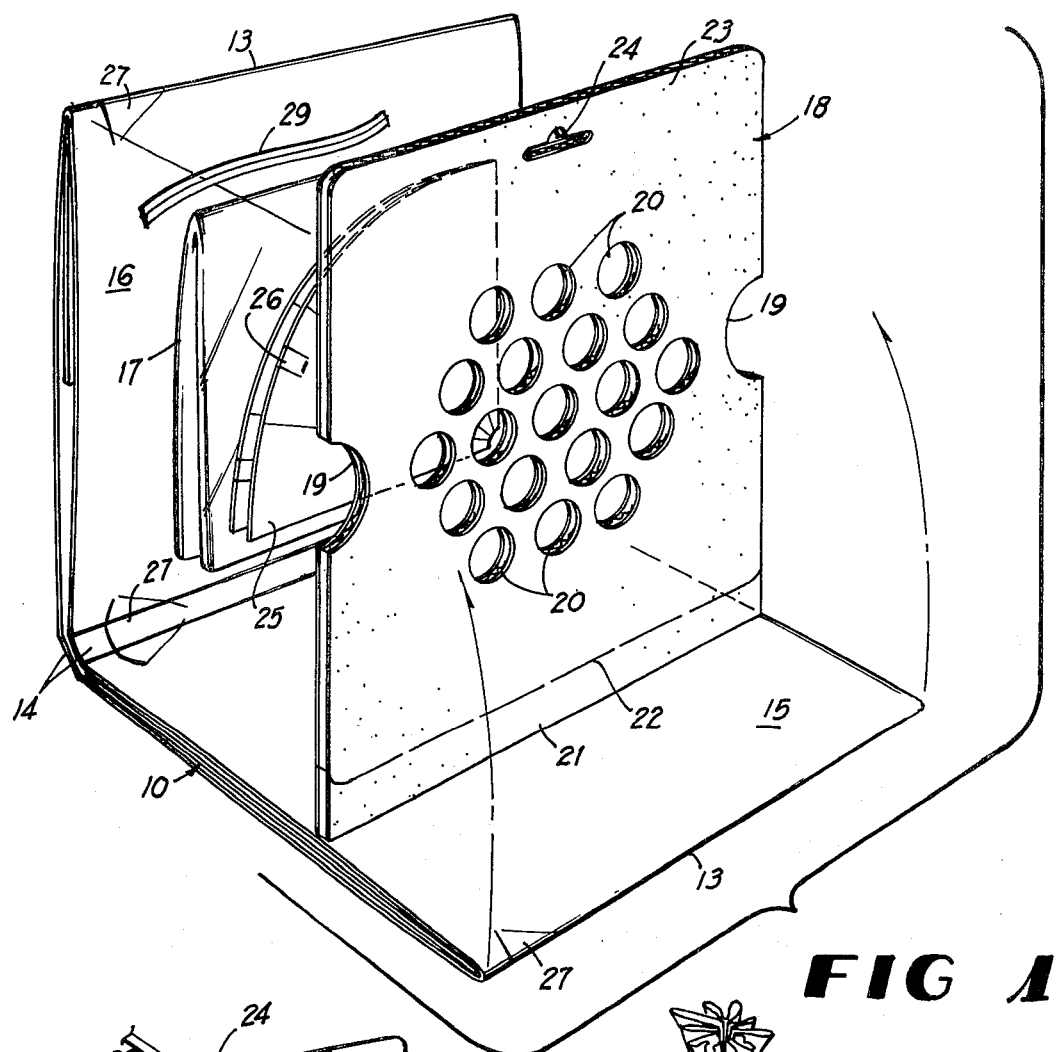
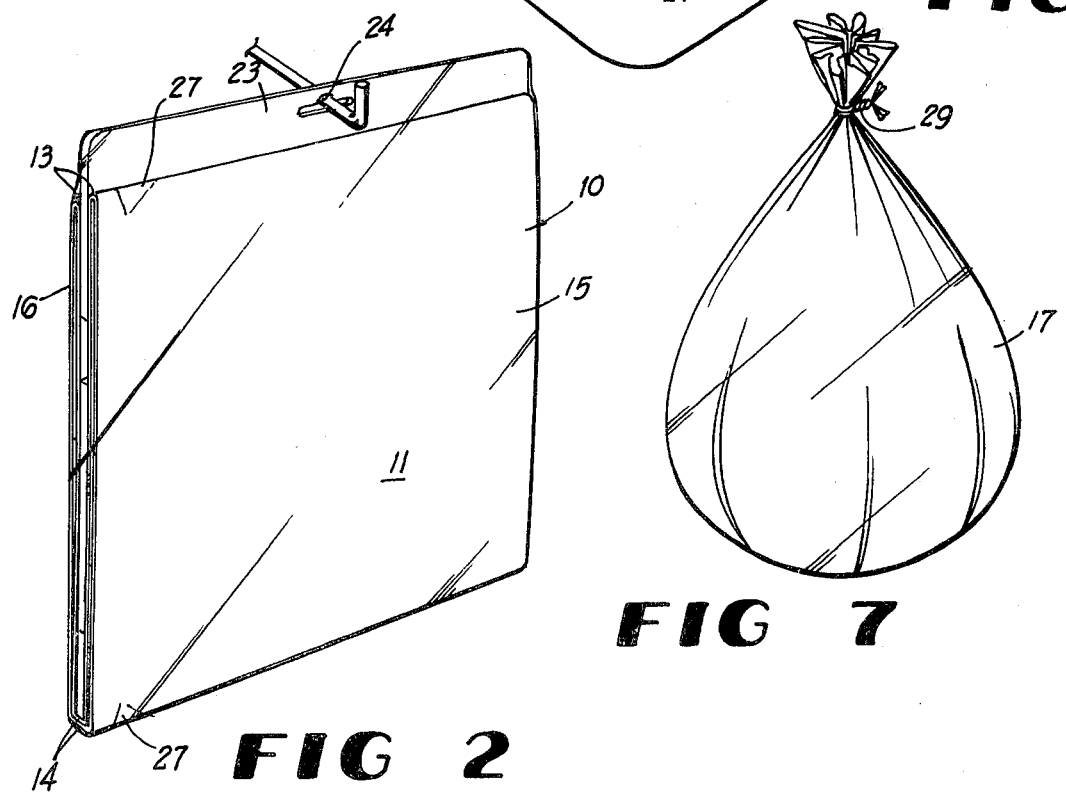

ENGINE OIL DRAINING ASSEMBLY

BACKGROUND OF THE INVENTION

Present day high costs for engine oil and for filling station service have induced many private automobile owners to drain and change their own oil at home. One disadvantage in doing this is the inconvenience of the operation caused by the unavailability of convenient low cost equipment for carrying out the operation. Generally, the individual changing engine oil will utilize any available household receptacle, such as a bowl or cooking pan, to receive the dirty oil, and will purchase a funnel for introducing fresh oil into the engine. While the job can be done in a somewhat haphazard manner, the dirty oil must be disposed of in some larger receptacle, thus increasing cost and adding further inconvenience to the procedure. There is greater likelihood of spilling the dirty oil during the oil changing operation using readily available household equipment.

With the above in mind, it is the object of this invention to provide a very low cost, single use, disposable assembly or kit for use in draining and changing engine oil, which assembly or kit is packaged in a highly compact manner for economical displaying on a suitable rack in a supermarket, drug-store, automotive accessory store or the like. The elements of the kit are designed to completely meet the requirements of draining dirty engine oil without spilling it, facilitating disposal of the dirty oil, and introducing fresh oil into the engine at the lowest possible cost.

Other objects and advantages of the invention will become apparent during the course of the following detailed description.

The prior art contains some broadly pertinent teachings and the following known U.S. patents are made of record herein under 37 C.F.R. 1.56:

| | |
|---|---|
| 2,896,788 | 3,726,469 |
| 3,422,985 | 3,804,134 |
| 3,517,875 | 4,022,257 |
| 3,703,956 | 4,064,969. |

The above patents show devices suitable for certain aspects of this invention, but no known prior art device includes the necessary components to achieve the complete utility of the invention. Neither do the referenced patents show a complete kit which can satisfy the requirements of the invention while having the ability to be packaged in the extremely compact and economical manner of the invention, for the convenience of the seller and the customer.

BRIEF DESCRIPTION OF THE DRAWINGS

FIG. 1 is a partly exploded perspective view of the invention minus the outer transparent film wrap.

FIG. 2 is a perspective view of the invention in package form.

FIG. 7 is a perspective view of the plastic liner serving as a disposable bag for dirty oil.

DETAILED DESCRIPTION

Figure 3:
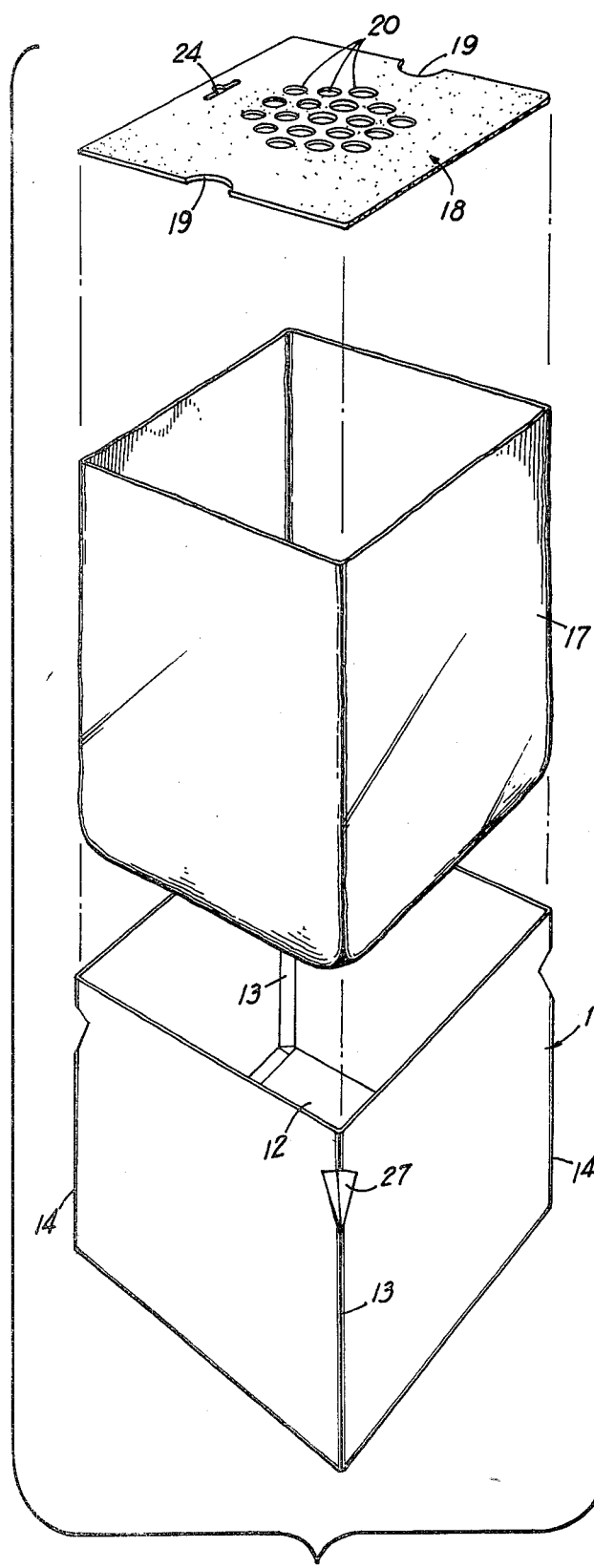
FIG. 3 is an exploded perspective view showing the collapsible drain receptacle, plastic liner and strainer.

Referring to the drawings in detail wherein like numerals designate like parts, the numeral 10 designates a collapsible or knock-down open top rectangular drain pan or receptacle formed of cardboard or the like. The pan or receptacle 10 is constructed to remain in the form shown in FIGS. 3 and 4 after it is erected and to collapse or fold readily into the form shown in FIG. 1, and by further folding into the essentially flat compact package form shown in FIG. 2 where an outside transparent wrapping film 11 encloses all components of the invention snugly as a unit.

The knock-down pan or receptacle 10 shown in FIG. 3 includes upwardly folding bottom wall flaps and an associated integral rectangular bottom wall panel 12 above said flaps. The flaps, not shown, and the bottom wall panel 12 collapse or fold upwardly under slight hand pressure to allow the rectangular receptacle 10 to fold across corners to assume the intermediate collapsed state shown in FIG. 1. In this operation, as thus far described, the receptacle 10 following upward folding of the bottom flaps and the panel 12 is folded across the two diagonal corners 13, FIG. 1 and 3. In this state, FIG. 1, the ramaining diagonal corners 14 in FIG. 3 are arranged as illustrated in FIG. 1 so that this cardboard or fiberboard pan or receptacle 10 and the separate components of the invention used therewith can be further and finally folded book-like to the flat packaged form shown in FIG. 2 within the wrap 11 and with the components snugly sandwiched between the two sides or portions 15 and 16 of the receptacle, as shown in FIG. 1.

Figure 4:
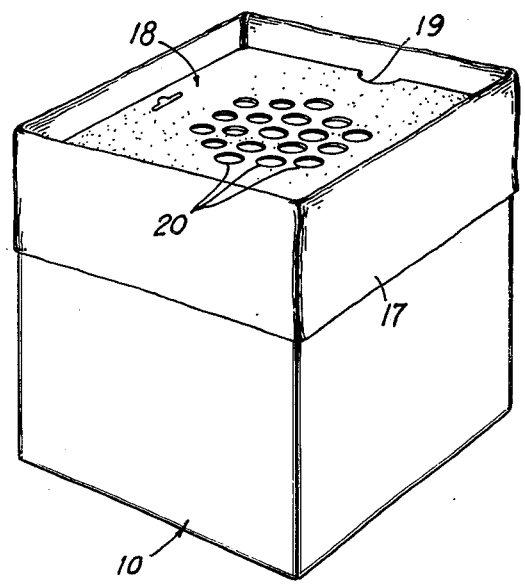
FIG. 4 is an assembled perspective view of the elements in FIG. 3.

An oil impermeable thin flexible plastic liner 17, preferably formed of polypropylene, is included in a flat folded form, FIG. 1, with other components between the two sides 15 and 16 in the completely folded flat package form of the device shown in FIG. 2. The liner 17 is longer than the height of receptacle 10 and when opened up, FIG. 3 is placed through the open upper end or mouth of and into the interior of the erected receptacle 10 with the mouth portion of the liner 17 folded outwardly over the open upper end or mouth of the receptacle 10, as shown in FIG. 4, so that the bottom portion of the liner 17 rests upon the inner surface of the bottom of the receptacle 10 and the liner 17 will conform generally to the shape of the interior of the receptacle 10, when liquid, i.e., oil is poured into liner 17.

The assembly or kit further comprises a flat substantially rectangular corrugated fiberboard strainer 18 having finger receiving notches 19 formed in opposite edges thereof, as well as a central array of spaced circular drain openings 20 for the free passage of oil. The strainer 18 will function to retain the drain plug thereon. Along one edge, the strainer 18 includes a relatively narrow separable tare strip 21 or extension which is separable from the body of the strainer 18 on a provided score line 22. During use of the strainer, as in FIG. 4, the strip 21 has been removed and discarded. The purpose of the separable strip 21 is to allow it to bottom on the lower corner 14 of the flat package shown in FIG. 2 so that the far side edge portion 23 of the strainer 18 can project above the corners 13 in the flat package. A slot 24 formed centrally in the edge portion 23 can receive a hook or other hanger element, not shown, of a conventional display rack in a supermarket, drugstore or the like. This enables a large number of the kits in flat package form to be conveniently and economically displayed in a store. It should also be understood that the strainer component 18 is one of the components held between the sides 15 and 16 of the finally folded receptacle 10 in the flat package form. The rectangular shape of the receptacle conforms to but is slightly smaller than the horizontal cross sectional interior dimensions of receptacle 10.

Figure 6:
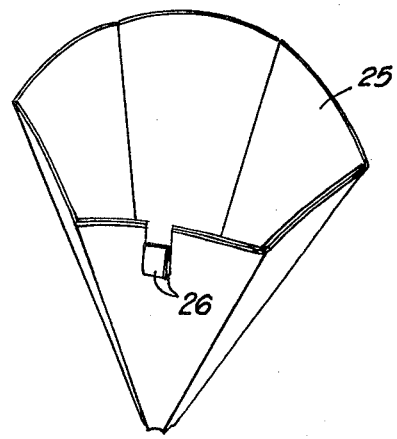
FIG. 6 is a perspective view of a collapsible funnel in the erected state.

A further component of the kit included in the flat package of FIG. 2 is a collapsible paper funnel 25 which can be easily erected by use of fold tabs 26 to the use form of FIG. 6. The funnel is employed to direct new engine oil into the engine. Like the remainder of the low cost kit, the funnel 25 can be discarded after a single usage.

Figure 5:
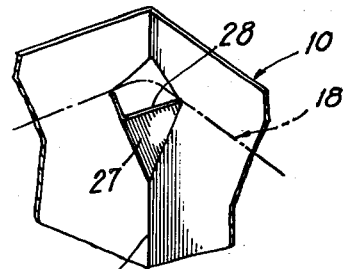
FIG. 5 is a fragmentary perspective view of a corner support for the strainer on the drain receptacle.

A unique and economical feature of the invention is the provision on the receptacle 10 at the four corners thereof and slightly below its open top of integral precut and precreased inwardly folding V-gussets 27, the top horizontal edges 28 of which form level supports for the corners of the rectangular strainer 18, FIG. 5. As shown in FIG. 4, the liner 17 is sufficiently flexible that, when the strainer 18 is received within the mouth of liner 17, within the receptacle 10, and the gussets 27 are deformed inwardly, the strainer 18 will be disposed horizontally and supported at its corners by these gussets 27, with portions of the liner 17 disposed, between each corner and gusset.

In use, the oil changing kits are sold to customers in the flat package form shown in FIG. 2 inside of the snug wrapper 11, as described. The customer removes the wrapper 11 to release the kit into the condition shown in FIG. 1. The cardboard receptacle 10 is unfolded and erected and the liner 17 is unfolded and inserted in the standing upwardly open, rectangular, tubular, receptacle 10. The gussets 27 are pushed inwardly to form corner supports for the horizontally disposed strainer 18 within liner 17, and after discarding the strip 21, the strainer is placed on the supports 28 with the parts arranged as in FIG. 4. The dirty oil from the engine crank case is released on the strainer 18 while the receptacle 10 is properly positioned beneath the crank case drain opening and the strained dirty oil enters the liner 17 held in the comparatively rigid receptacle 10, the oil causing the liner 17 to conform generally to the shape of the interior of receptacle 10. The drain plug (not shown) which is usually dropped as the engine is drained is retained on the strainer 18.

When the dirty engine oil is completely drained, strainer 18 can be lifted by use of the finger notches 19 and discarded in the trash. The mouth of the liner 17 is closed and secured by a tie element 29 provided in the kit, as shown in FIG. 1. The liner 17 is thus transformed into a closed impermeable bag containing the dirty oil and can be lifted cleanly from the receptacle 10 for disposal in a customary manner. As previously explained, the funnel 25 is erected and is used to place fresh oil in the engine. After use, in the described manner, the entire kit can be discarded in the trash and this is feasible because of its very low cost.

Figure 8:
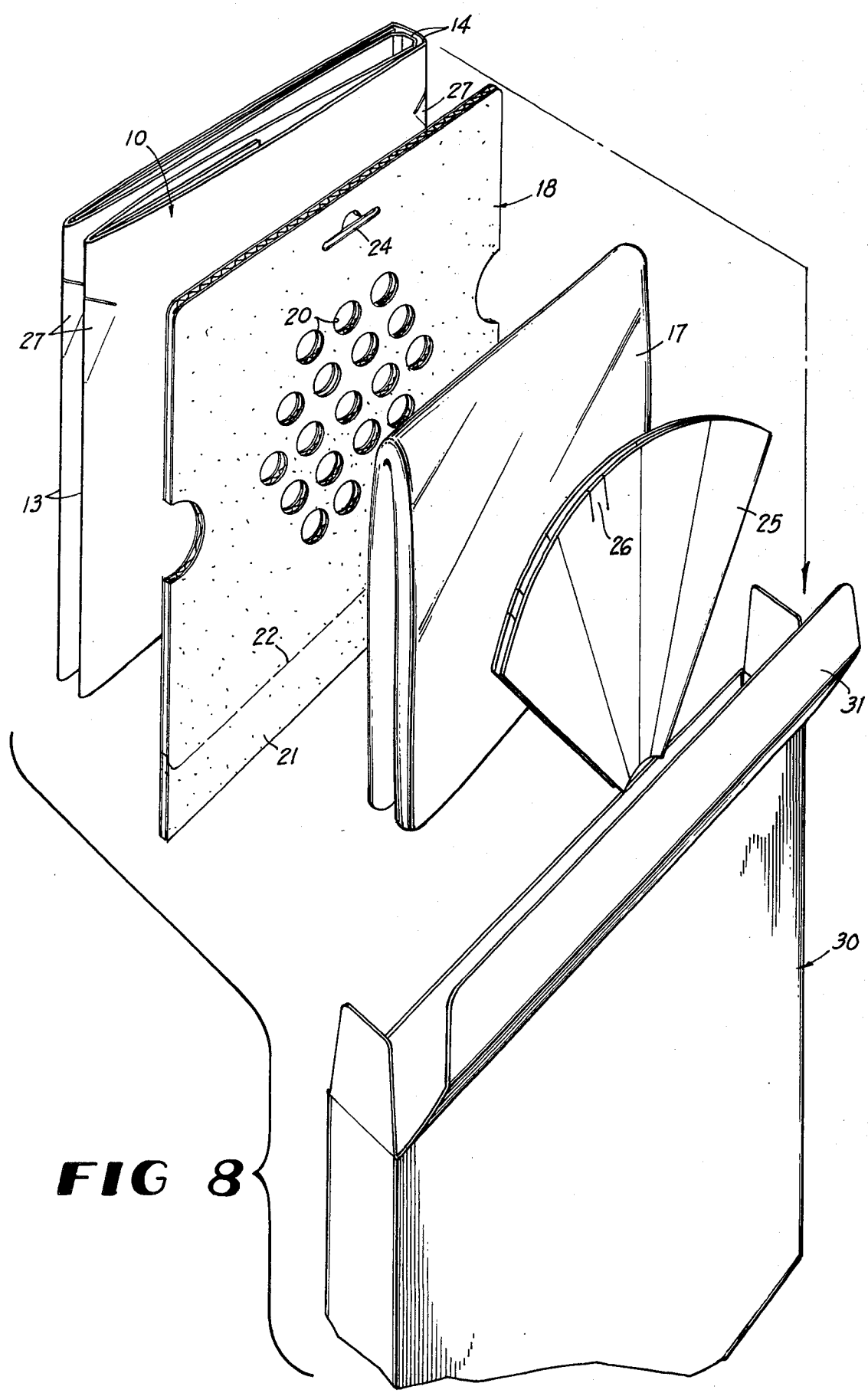
FIG. 8 is an exploded perspective view of the invention according to a modified embodiment.

FIG. 8 shows a second embodiment of the invention wherein the principal components 10, 18, 17 and 25 are identical in construction and use to the corresponding elements in the previously-described embodiment. However, in lieu of the outer transparent wrapper 11 for the flat package arrangement shown in FIG. 2, a slender rectangular box 30 having a hinged closure flap 31 is provided to receive the folded and collapsed kit components 10, 18, 17 and 25. The package suspension feature 24 of FIG. 2 is not utilized. The boxed assembly or kit of FIG. 8 may be placed on a suitable stand or rack in a store with any desired advertising or instructional indicia printed on the box 30 and/or on the components.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An engine oil change kit comprising a receptacle body formed of sheet material and being erectable to produce an open top receptacle and foldable into a collapsed state, a flexible bag liner for the receptacle body and being oil impermeable, a strainer adapted to span the open top of the erected receptacle, integral support elements for the strainer on the erected receptacle, a collapsible and erectable funnel for use in delivering fresh oil to an engine, and an outer package for said receptacle body and said funnel in the collapsed state, for said liner in a folded state and said strainer, whereby said kit is essentially flat and compact when packaged, said receptacle body having an intermediate book-like form including hinged sides, said folded liner, said strainer and said funnel in the collapsed state being insertable between said hinged sides with said sides folded toward each other in substantial parallelism for placement as a unit in said outer package, said outer package being formed from a snug fitting flexible wrapper fully enclosing and confining said kit, said strainer comprising a flat plate-like element including a detachable strip along one edge thereof, the far edge portion of the strainer having a support aperture, said strip adapted to bottom against the hinge of the collapsed receptacle body in said intermediate form with said far edge portion and aperture extending beyond the ends of said hinged sides remote from the hinge, whereby a display rack package suspension element may engage through said aperture.

2. An engine oil change kit comprising a collapsible and foldable receptacle body adapted to be erected into an open top receptacle having side and bottom walls, the receptacle body having an intermediate book-like collapsed form including hinged sides, an oil impermeable bag liner for the erected receptacle, a plate-like filter element for the top of the erected receptacle disposed between said hinged sides in opposing relationship to the sides and to each other and sandwiched compactly between the sides when the sides are swung into substantially parallel opposing relationship, an outer package means for the receptacle body portion and elements sandwiched between the sides thereof, the outer package means comprising a wrapper film enveloping said receptacle body portion and elements snugly to form a thin flat kit package, and a detachable apertured extension on the plate-like filter element projecting outwardly of said sides when the sides are in said parallel opposing relationship to form a suspension means for the kit package.

* * * * *